United States Patent

Cronin

(10) Patent No.: US 8,024,925 B2
(45) Date of Patent: Sep. 27, 2011

(54) APPARATUS, SYSTEM, AND METHOD FOR CONTROLLING A DESIRED TORQUE OUTPUT

(75) Inventor: Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 574 days.

(21) Appl. No.: 11/269,392

(22) Filed: Nov. 8, 2005

(65) Prior Publication Data

US 2007/0101709 A1    May 10, 2007

(51) Int. Cl.
*F16D 31/02* (2006.01)
(52) U.S. Cl. .......................................................... 60/451
(58) Field of Classification Search .................... 60/445, 60/451

See application file for complete search history.

(56) References Cited

U.S. PATENT DOCUMENTS

| | | | |
|---|---|---|---|
| 3,590,577 A | 7/1971 | Utter | |
| 3,727,402 A | 4/1973 | Keith et al. | |
| 3,952,515 A | 4/1976 | Habiger et al. | |
| 3,998,287 A | 12/1976 | Paramythioti | |
| 4,191,091 A * | 3/1980 | Zeuner et al. | 60/444 |
| 4,203,293 A | 5/1980 | Bubula et al. | |
| 4,459,878 A * | 7/1984 | Frank | 477/39 |
| 4,510,750 A | 4/1985 | Izumi et al. | |
| 4,518,320 A * | 5/1985 | Goodell | 60/443 |
| 4,561,250 A * | 12/1985 | Aoyagi et al. | 60/444 |
| 4,612,827 A * | 9/1986 | Omitsu | 477/43 |
| 4,879,501 A | 11/1989 | Haner | |
| 4,977,760 A | 12/1990 | Ishimori et al. | |
| 5,295,795 A * | 3/1994 | Yasuda et al. | 60/445 |
| 5,667,452 A | 9/1997 | Coutant | |
| 6,048,177 A | 4/2000 | Erkkilae et al. | |
| 6,424,902 B1 | 7/2002 | Kuras | |
| 6,684,636 B2 * | 2/2004 | Smith | 60/450 |
| 2003/0205044 A1 * | 11/2003 | Franz | 60/445 |

FOREIGN PATENT DOCUMENTS

| | | |
|---|---|---|
| DE | 2848595 | 11/1978 |
| DE | 4308198 | 7/1994 |

* cited by examiner

*Primary Examiner* — Daniel Lopez
(74) *Attorney, Agent, or Firm* — Mike King; Finnegan, Henderson, Farabow, Garrett & Dunner LLP; Leydig, Voit & Mayer

(57) ABSTRACT

Apparatus, system, and method for controlling a desired torque output on a hydromechanical transmission. Controlling torque output of a hydromechanical transmission provides improved operator feel and control. A control module determines a desired torque output and determines a pressure necessary to influence the displacement of the variable displacement pump to output the desired torque output. A pressure-controlling valve applies that amount of pressure to an actuator, which moves in response thereto, to change the displacement of the variable displacement pump. When the motor speed changes, the control module adjusts the pressure applied to the actuator to provide the desired torque output.

10 Claims, 6 Drawing Sheets

APPARATUS, SYSTEM, AND METHOD FOR CONTROLLING A DESIRED TORQUE OUTPUT

TECHNICAL FIELD

The present invention relates to transmission controls, and more specifically to controlling a desired torque output from a hydromechanical transmission.

BACKGROUND

Hydromechanical, split torque, or parallel path powertrains provide many advantages over the typical mechanical transmissions used in earth-working machines, such as tractors, bulldozers, and wheel loaders. Specifically, hydromechanical transmissions provide continuous speed control, control of acceleration and deceleration, and management of engine speed with fewer losses.

Current industry practice with hydromechanical transmissions is to control speed by controlling pump displacement. This practice requires a servo-feedback control on a pump actuator to force the pump actuator to a specific position. Industry has had a measure of success with speed control systems in the agricultural industry but no known successes in the earth-moving industry. The lack of force (torque) control put the earth-working machines with hydromechanical powertrains at a disadvantage when compared to conventional powertrains, particularly when the machine was pushing against massive objects, or digging. Similarly, it was found that because earth-working machines are often employed on rapidly changing surface conditions and compromised stability, it was inherently harder to make smooth speed transitions with the traditional speed control system.

One type of system for controlling speed is discussed in U.S. Pat. No. 6,684,636 to Smith. Smith teaches a method for controlling speed using an electrical signal applied to a solenoid to change the pump's displacement. On generally level surfaces, this method has been successful, however, as discussed above, on uneven surfaces, an operator, or machine experiences undesirable accelerations as the controls hunt for the desired speed.

The inability to determine the correct pump displacement under rapidly changing surface conditions has resulted in the unsuccessful use of the speed control system in the earth-moving industry. Any error in the displacement showed up as lugs and lurches and generally unfamiliar machine behavior when compared to the precedent established by past generations of successful earthmoving machines.

The present invention is directed to overcoming one or more of the problems as set forth above.

SUMMARY OF THE INVENTION

In one aspect, an apparatus for controlling a desired torque output from a hydromechanical transmission. The apparatus comprises a control module configured to determine the desired torque and to determine an amount of pressure necessary to influence the displacement of a variable displacement pump to output the desired torque.

In another aspect, a hydromechanical transmission for outputting a desired torque is provided. The hydromechanical transmission comprises a variable displacement pump drivingly connected to a suitable output producing device such as an internal combustion engine, a fixed displacement motor drivingly connected to the variable displacement pump, a gear system, an actuator, and a control module. The actuator is configured to influence displacement of the variable displacement pump and the control module is configured to determine the desired torque and to determine an amount of pressure necessary to influence the actuator to adjust the displacement of the variable displacement pump to output the desired torque.

In another aspect, a method for controlling a desired torque output from a hydromechanical transmission is provided. The method includes the steps of determining the desired torque and outputting the desired torque from a motor of the hydromechanical transmission.

It is to be understood that both the foregoing general description and the following detailed description are exemplary and explanatory only and are not restrictive of the invention.

BRIEF DESCRIPTION OF THE DRAWINGS

The accompanying drawings illustrate exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings.

Figure 1:
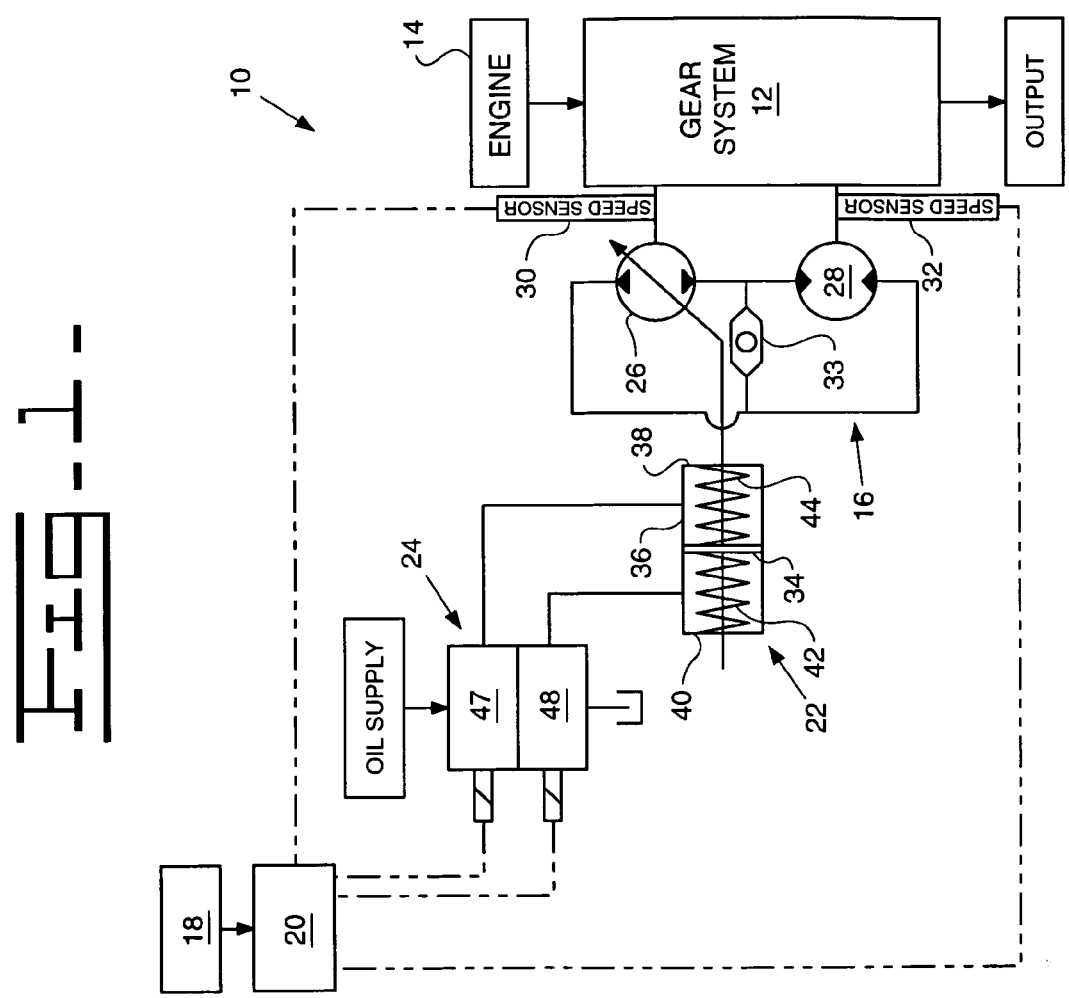
FIG. 1 illustrates a schematic for controlling torque output from a motor on a hydromechanical transmission.

Referring to FIG. 1, a schematic for controlling torque output from a hydromechanical transmission 10 is shown. The hydromechanical transmission 10 comprises a gear system 12, a hydrostatic unit 16, an input module 18, a control module 20, an actuator 22, and a valve system 24.

The gear system, such as a transmission, 12 typically outputs to a traction device (not shown) on an earth-working machine. The traction device may include wheels located on each side of the earth-working machine. Alternatively, the traction device may include tracks, belts, or other driven traction implements. Preferably, an internal arrangement of the gear system 12 is a power split, a hydromechanical arrangement of the input coupled type, or a variable unit driven solely by an input, with one or more shiftable ranges. Other arrangements, such as output and series coupled, are also envisioned.

The hydromechanical transmission 10 connects to an engine 14, which may be any type of output producing device, such as an internal combustion engine, gas or diesel, a motor, pump, or generator and motor. The engine 14 provides rotational energy to the hydrostatic unit 16 as well as the gear system 12.

The hydrostatic unit 16 comprises at least two rotating groups. The rotating groups include a variable displacement pump 26 and a fixed displacement motor 28, however the rotating groups may both be variable displacement. The variable displacement pump 26 fluidly drives the fixed displacement motor 28 to output rotational energy to the gear system 12. The hydrostatic unit 16 may be axial piston, bent axis, or other known configuration. Similarly, the hydrostatic unit 16 may be arranged in a "U", inline, or other known arrangement.

The input module 18 receives commands, or instructions, from a command source and transmits the commands to the control module 20 to operate the earth-working machine according to the received commands. The input module 18 may include a position sensor and/or the input module 18 may be a throttle control device. The input module 18 may be a dial, a keyboard, an interactive display, electrical buttons, switches and pedals, or known programming technique. The received commands may be data identifying a desired input, predetermined criteria, a particular condition, or established parameters entered into the input module 18. The commands may be preprogrammed into the control module 20 to perform according to predetermined criteria and/or parameters, under predetermined conditions. The command source may be an operator, such as a human being, or a set of code, software, or circuitry configured to perform a particular function.

The control module 20 communicates with the input module 18, first and second speed sensors 30 and 32, a resolver 33, and the valve system 24. The control module 20 receives command input from the input module 18 and determines what motor torque output is desired to provide the desired machine response. Other sensors may be added as necessary to provide additional feedback or system information.

It is noted that a module, such as the input module 18 and the control module 20, may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Figure 2:
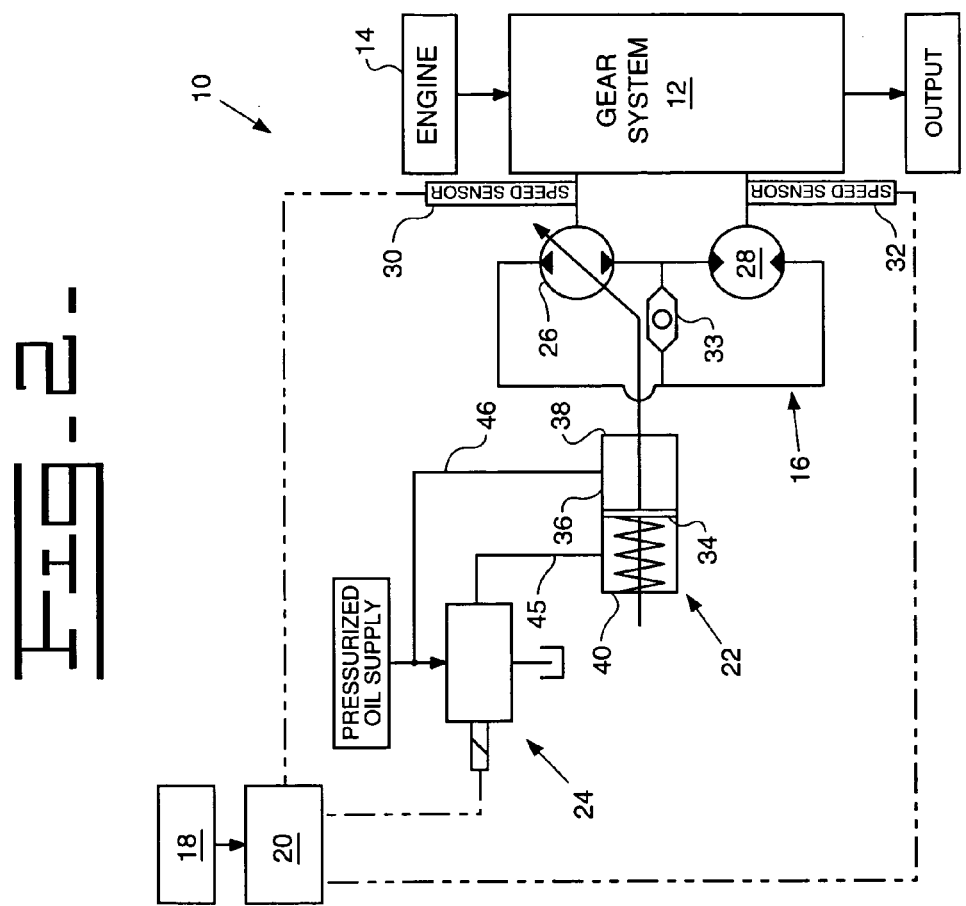
FIG. 2 illustrates a schematic of an optional embodiment for controlling torque output from a motor on a hydromechanical transmission.
Figure 3:
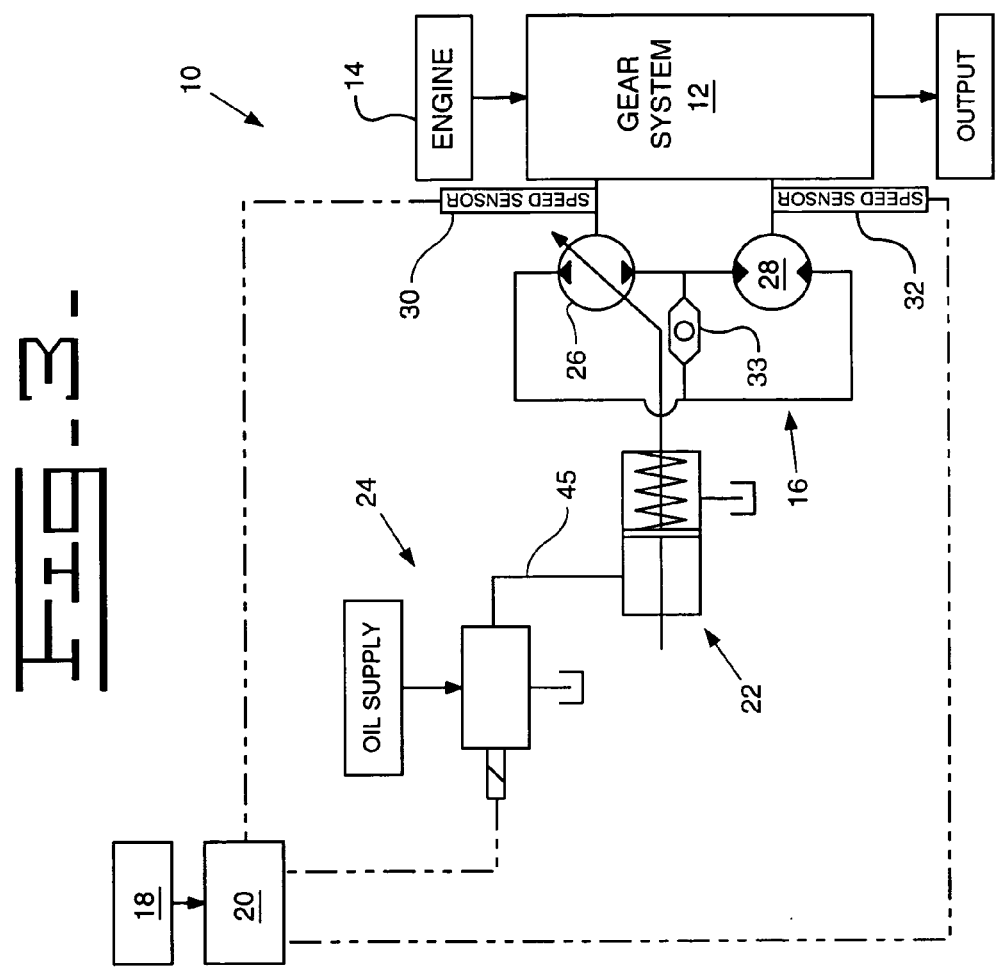
FIG. 3 illustrates a schematic of another optional embodiment for controlling torque output from a motor on a hydromechanical transmission.

The control module 20 controls the actuator 22, which influences the displacement of the variable displacement pump 26. The actuator 22 comprises a piston 34 centrally located in a cylinder 36. A pressure differential between a first side 38 and a second side 40 of the cylinder 36 effectuates a desired displacement of the variable displacement pump 26. Alternatively, as illustrated in FIG. 2, the actuator 22 may include spring force and control pressure 45 on one side of the actuator 22 and supply pressure 46 on the other. In yet another embodiment, illustrated in FIG. 3, the actuator 22 may include control pressure 45 on one side and spring force on the other. Alternatively, the actuator 22 may comprise two single acting cylinders (not shown) of equal or different areas, each configured to receive pressurized fluid from the pressure controlling valves 47 and 48. One skilled in the art will realize that the actuator 22 may be controlled by a variety of forces in a variety of ways.

Referring back to FIG. 1, the actuator 22 includes actuator springs 42 and 44 configured to produce a centering force proportional to position, without discontinuity, throughout the entire range of displacement.

It is noted that, for conventional hydrostatic applications, zero displacement means zero output speed. Historically pumps have centering springs arranged to provide a large force discontinuity precisely at zero displacement that return the pump to zero displacement under any condition. This characteristic is very useful for conventional hydrostatics but it limits their ability to manage directional shifts. For hydro-mechanical applications in general, the zero displacement/angle position holds no special significance whatsoever and moving smoothly through the zero displacement/angle is highly preferred. As a result, eliminating the springs altogether would be desirable. However the inertia of the pump pistons tend to stroke the pump away from zero displacement. Special speed matching conditions within the gear system require enough centering spring force to overcome the piston inertia.

Figure 4:
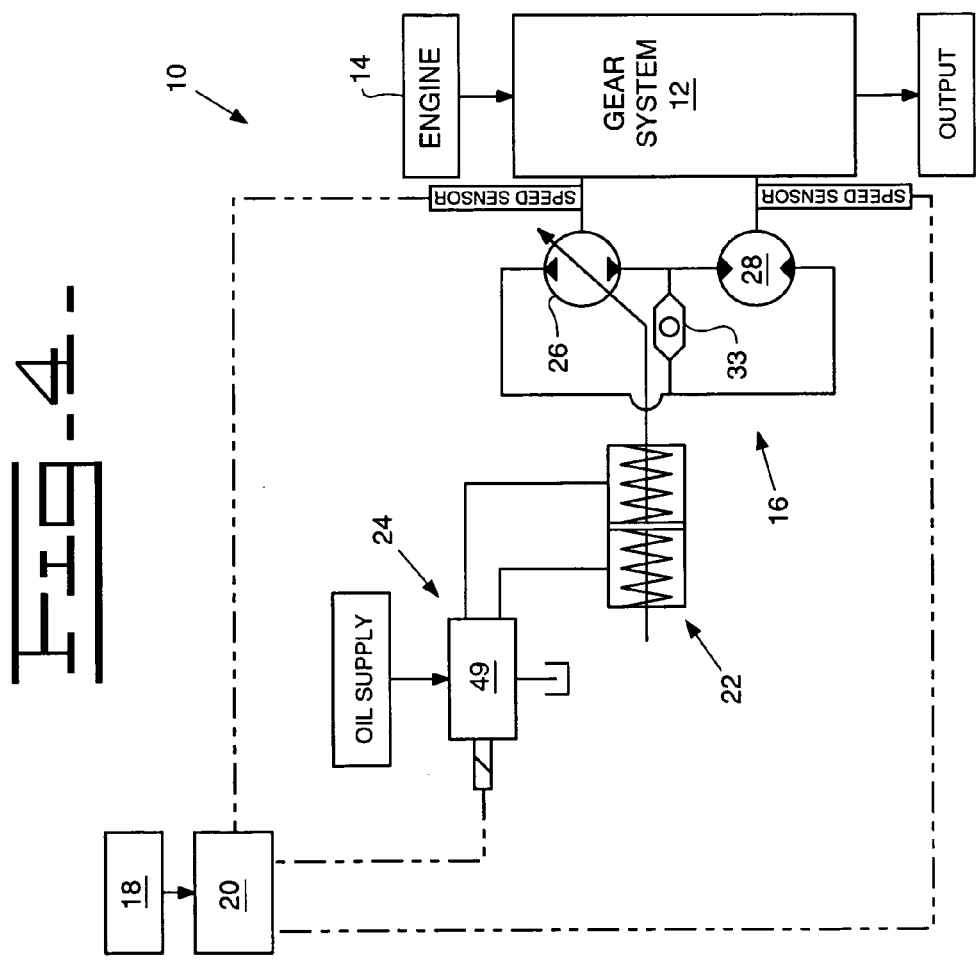
FIG. 4 illustrates a schematic of a further optional embodiment for controlling torque output from a motor on a hydromechanical transmission.

The valve system 24 adjusts the pressure acting on the actuator 22 according to signals from the control module 20. The valve system 24 includes first and second pressure controlling valves 47 and 48. The first pressure-controlling valve 47 communicably connects to the control module 20 and the first side 38 of the actuator 22, and the second pressure-controlling valve 48 communicably connects to the control module 20 and the second side 40 of the actuator 22. The first and second pressure controlling valves 47 and 48 supply known pressures as a function of command input from control module 20. In another embodiment, illustrated in FIG. 4, the valve system 24 comprises a single electro-hydraulic valve 49 with a pressure differential output.

Figure 5:
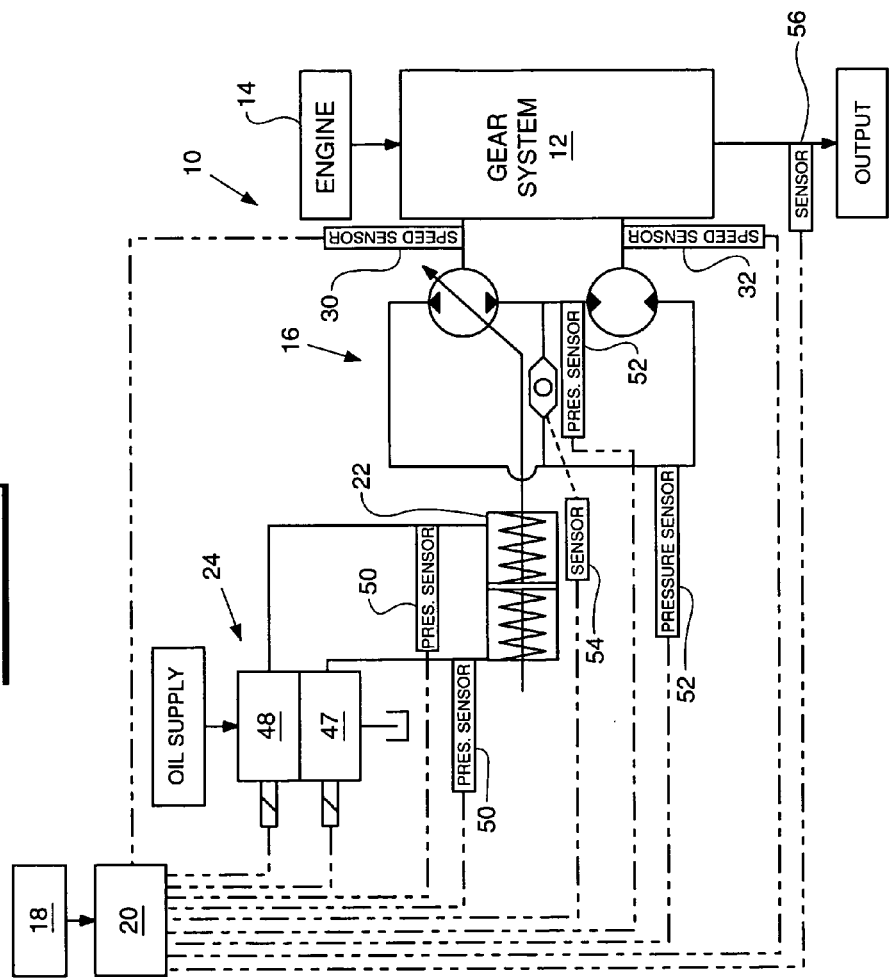
FIG. 5 illustrates a schematic for controlling torque output including optional sensors.

FIG. 5 illustrates locations of optional sensors according to one embodiment of the present invention. Pressure sensors 50 may be added to first and second pressure controlling valve and outlets to monitor actual pressures. The sensors 50 communicate with the control module 20 to provide information to control valve flow losses, valve-to-valve variations, and valve nonlinearities. Pressure sensors 52 may also be added to the hydrostatic unit 16 to reduce the need for pump mapping and provide more accurate pressure limiting. The additional sensor arrangements improve diagnostic and error detection functions.

Figure 6:
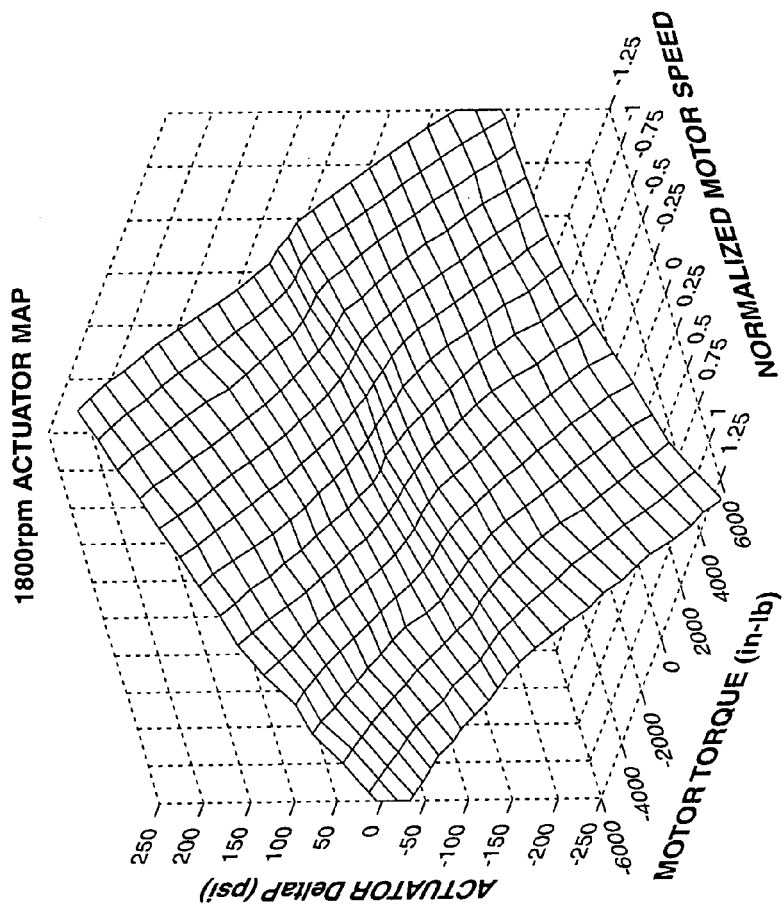
FIG. 6 illustrates an actuator map for determining an actuator pressure difference to effectuate a desired displacement of a variable displacement pump.

Referring to FIG. 6, a map for determining variable displacement actuator force is shown. The illustrated map shows actuator force (Actuator DeltaP) for a single input speed of 1,800 revolutions per minute to effectuate an effective displacement of the variable displacement pump 26 to output a desired torque at an existing motor speed. The control module 20 manages Actuator DeltaP (psi) via the valve system 24.

The map relates variable displacement actuator force to desired output torque, variable displacement pump speed and normalized motor speed. Variable displacement actuator force is a function of circuit pressure, variable displacement pump shaft speed, and variable displacement pump displacement angle. Circuit pressure also relates to motor torque through its fixed hydraulic displacement. Fixed displacement motor torque is a function of output torque through mechanical reductions in the gear system 12. Variable displacement pump speed is known from the first speed sensor 30. Variable displacement pump displacement angle is generally proportional to normalized motor speed, which is the ratio of fixed displacement motor speed to variable displacement pump speed. Normalized motor speed is calculated within the control module 20 with input from the first and second speed sensors 30 and 32.

The control module 20 refers to the map to determine the Actuator DeltaP (or variable displacement actuator force) to influence the position of the actuator 22. Upon determination of the proper Actuator DeltaP, the valve system 24 effectuates the proper force against the actuator 22 so that the actuator 22, or force against the actuator 22, exerts that amount of force on the variable displacement pump 26.

It is noted that for different input speeds a different mapping surface is used. It is further noted that for systems with multiple pumps, each pump may require its own map.

INDUSTRIAL APPLICABILITY

In operation, on earth-working machines, the engine 14 outputs to the gear system 12 and the hydraulic unit 16, which also outputs to the gear system 12. In combination, the hydraulic unit 16 and gear system 12 form a hydromechanical transmission.

To effectuate the desired machine response and to output the desired torque, the control module 20 receives input information from the command source and input module 18. The command source enters the predetermined criteria, parameters, or conditions into the input module 18. The control module 20 processes the input information to determine the desired torque for the given input, determines input speed, determines normalized motor speed, and refers to the map to determine how much actuator force is necessary to effectuate the desired displacement of the variable displacement pump 26. The control module 20 may determine the desired torque from a position sensor of the input module 18, and the input module 18 may be a throttle control device. In response to a signal indicative of the required actuator force, the first and second pressure controlling valves 47 and 48 cooperate to provide a pressure to the actuator to produce a force against the piston to influence displacement of the variable displacement pump 26. The displacement of the variable displacement pump 26 adjusts accordingly to produce a predetermined pressure difference in the hydrostatic circuit between the pump 26 and the motor 28. The motor 28 outputs a torque as a function of the pressure difference in the hydrostatic circuit.

Sensors 50, 52, and 56 are positioned throughout the hydraulic circuit to monitor actual pressures and speeds. The information obtained from the sensors 50, 52, 54, and 56 is transmitted to the control module 20, which adjusts the system as necessary to maintain the desired torque.

As resistance to machine movement increases, for example, as the machine pushes against a pile of dirt or rock, or as the machine climbs a hill, the speed of the motor changes. Consequently, the normalized motor speed changes. The control module 20 recognizes the change, refers to the map and determines a new actuator DeltaP necessary for maintaining the desired torque. Subsequently, the control module 20 sends a signal to the pressure controlling valves 47 and 48 to adjust the pressures within the actuator according to the determined actuator DeltaP. The pressure controlling valves provide the determined pressure (DeltaP) to the actuator 22, which moves the piston 34 to effectuate a corresponding change in the displacement of the variable displacement pump. The pressure difference within the hydrostatic circuit adjusts accordingly, which causes the motor to output the desired torque.

It will be apparent to those skilled in the art that various modifications and variations can be made in the disclosed system for controlling torque output without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A hydromechanical transmission for outputting a desired torque, comprising:
    a variable displacement pump configured to be drivingly connected to an engine;
    a motor drivingly connected to the variable displacement pump;
    an actuator configured to receive pressure to manage a circuit pressure of the variable displacement pump; and
    a control module configured to determine the desired torque and to calculate an amount of pressure to apply to the actuator to adjust the variable displacement pump to cause the hydromechanical transmission to output substantially matching the desired torque; and
    a pressure controlling device communicably coupled to the control module and the actuator and configured to adjust the pressure in the actuator in response to a signal from the control module, wherein the pressure controlling device includes a first pressure controlling valve coupled to the control module and a first side of the actuator, configured to adjust a pressure on a first side of the actuator in response to a first signal and a second pressure-controlling valve coupled to the control module and a second side of the actuator, to adjust a pressure on a second side of the actuator in response to a second signal, and a first pressure sensor connected to an output from the first pressure controlling valve, and a second pressure sensor connected to an output from the second pressure-controlling valve.

2. The transmission of claim 1, wherein the first and second pressure controlling valves are electro-hydraulic valves configured to provide a pressure differential output.

3. The transmission of claim 1, wherein the actuator is spring-biased.

4. The transmission of claim 1, further comprising a resolver communicably coupled to the control module and configured to provide circuit pressure between the variable displacement pump and the motor.

5. The transmission of claim 1, further comprising: a first speed sensor positioned to provide a speed of the variable displacement pump; and a second speed sensor positioned to provide a speed of the motor.

6. The transmission of claim 1, wherein the control module determines the amount of pressure to apply to the actuator to adjust the variable displacement pump to result in a transmission output substantially matching the desired torque based on the desired output torque and a calculated normalized motor speed.

7. The transmission of claim 1, wherein the actuator comprises a cylinder and a piston, the piston being slidably located within the cylinder, wherein the piston moves in response to a signal from the control module to influence the output torque of the variable displacement pump.

8. The transmission according to claim 7, wherein the actuator includes at least one spring acting against a piston of the actuator.

9. The hydromechanical transmission of claim 1, wherein the control module is configured to calculate the amount of pressure based on the desired torque and at least one of a speed of a motor of the hydromechanical transmission and a speed of the variable displacement pump.

10. The hydromechanical transmission of claim 1, wherein the control module is configured to calculate the amount of pressure based on the desired torque, a speed of a motor of the hydromechanical transmission, and a speed of the variable displacement pump.

* * * * *